(12) United States Patent
Järvinen et al.

(10) Patent No.: US 11,220,827 B2
(45) Date of Patent: Jan. 11, 2022

(54) FLOOR UNDERLAYMENT (71) Applicant: Jackon Finland Oy, Sastamala (FI)

(72) Inventors: Mikko Järvinen, Tampere (FI); Hannu Kainulainen, Tampere (FI); Seppo Laikko, Sastamala (FI); Jukka Mälkönen, Muurla (FI)

(73) Assignee: Jackon Finland Oy, Sastamala (FI)

( * ) Notice: Subject to any disclaimer, the term of this patent is extended or adjusted under 35 U.S.C. 154(b) by 0 days.

(21) Appl. No.: 17/023,554

(22) Filed: Sep. 17, 2020

(65) Prior Publication Data
US 2021/0246670 A1 Aug. 12, 2021

(30) Foreign Application Priority Data
Feb. 7, 2020 (EP) ..................... 20156060

(51) Int. Cl.
| | |
|---|---|
| *E04F 15/20* | (2006.01) |
| *E04B 1/62* | (2006.01) |
| *B32B 5/16* | (2006.01) |
| *B32B 27/32* | (2006.01) |
| *B32B 5/18* | (2006.01) |
| *B32B 27/06* | (2006.01) |
| *B32B 27/30* | (2006.01) |
| *B32B 27/14* | (2006.01) |
| *E01C 13/02* | (2006.01) |
| *E04F 15/10* | (2006.01) |

(52) U.S. Cl.
CPC ............... *E04F 15/20* (2013.01); *B32B 5/16* (2013.01); *B32B 5/18* (2013.01); *B32B 27/065* (2013.01); *B32B 27/14* (2013.01); *B32B 27/302* (2013.01); *B32B 27/32* (2013.01); *E01C 13/02* (2013.01); *E04B 1/625* (2013.01); *B32B 2250/03* (2013.01); *B32B 2250/24* (2013.01); *B32B 2250/40* (2013.01); *B32B 2307/102* (2013.01); *B32B 2307/732* (2013.01); *B32B 2419/00* (2013.01); *E04F 15/105* (2013.01)

(58) Field of Classification Search
CPC ........ E04F 15/20; E04F 15/105; E01C 13/02; B32B 27/14; B32B 27/065; B32B 27/32; B32B 27/302; B32B 5/16; B32B 5/18; B32B 2419/00; B32B 2250/03; B32B 2307/732; B32B 2250/40; B32B 2307/102; B32B 2250/24; E04B 1/625
See application file for complete search history.

(56) References Cited

U.S. PATENT DOCUMENTS

| | | | |
|---|---|---|---|
| 2007/0202303 A1 | 8/2007 | Bischoff et al. | |
| 2011/0197543 A1* | 8/2011 | Lee | B32B 27/08 |
| | | | 428/304.4 |
| 2014/0186113 A1* | 7/2014 | Sawyer | E01C 3/006 |
| | | | 404/41 |
| 2016/0016377 A1* | 1/2016 | Ford | B32B 27/36 |
| | | | 52/309.14 |

* cited by examiner

*Primary Examiner* — Frank J Vineis
*Assistant Examiner* — Donald M Flores, Jr.
(74) *Attorney, Agent, or Firm* — Merchant & Gould P.C.

(57) ABSTRACT

The invention relates to a floor underlayment comprising a first layer, a second layer, and an inner layer between the first layer and the second layer, wherein the inner layer has one layer of foam beads, and the floor underlayment has a thickness from 0.8 mm to 1.5 mm. The invention further relates to a method for manufacturing a floor underlayment, a flooring system and a use of a floor underlayment.

13 Claims, 4 Drawing Sheets

FLOOR UNDERLAYMENT

PRIORITY

This application is a U.S. non-provisional application and claiming priority of European application no. 20156060.4, filed on 7 Feb. 2020, the contents of which are incorporated herein by reference.

TECHNICAL FIELD

This invention relates to a floor underlayment. This invention further relates to an arrangement comprising a floor underlayment and a floor. This invention further relates to a method for making a floor underlayment. This invention relates to a use of a floor underlayment for disposal under a floor surface, ag, under a surface of an LVT floor.

BACKGROUND

There are many conventional flooring systems providing a floor underlayment between the floor and the subfloor. For example, textile pads are widely used when wood flooring, such as a parquet, is applied over subflooring. The floor underlayment may absorb impact sound, such as from persons walking on the floor. The floor underlayment may further form a moisture barrier, e.g, a vapour control layer, between the subfloor and the floor. The underlayment may also eliminate slight variations and, hence, may provide even and firm support to the finished floor. Methods for preparing a conventional floor underlayment are known to those skilled in this art. However, the conventional floor underlayment is not performing very well with some floors, such as thin LVT floors.

SUMMARY

The present invention discloses a floor underlayment comprising an inner layer between two outer layers.

The object of the present invention is to provide an improved floor underlayment. Aspects of the invention are characterized by what is stated in the independent claims. Various embodiments of the invention are disclosed in the dependent claims.

It is desirable to provide a floor underlayment that can be installed between a subfloor and finished flooring and which is suitable for thin floors, such as thin LVT floors. However, conventional floor underlayment, which have been used with e.g. laminates, may not be very advantageous for thin LVT floors. Conventional floor underlayment having a thickness of more than 2 mm may decrease some properties, such as durability, of the thin flooring. However, the floor underlayment, if having a thickness of less than 2 mm, has conventionally shown poor properties, such as too low compressive strength. Thus, it has not been possible to decrease thickness of the floor underlayment.

The inventors of the present invention have surprisingly invented a novel floor underlayment having a thickness of equal to or less than 1.5 mm, which novel floor underlayment may have suitable properties for many floorings, including thin floorings.

The novel floor underlayment can have significantly improved compressive strength. Further, the floor underlayment may reduce impact sound insulation. Furthermore, the novel floor underlayment may provide a barrier against moisture.

Floors may comprise hygroscopic materials. Thus, water and water vapor can enter the floor which may cause it to swell and change its shape and/or size. Further, when the moisture leaves the floor, it can shrink which may result e.g. cracks in the surface of the floor. The finished flooring provides a decorative floor surface, wherein any kind of crack is unwanted feature for the floor.

The floor underlayment may have a moisture barrier between the finished floor and the subfloor. The moisture barrier may comprise a thin film layer. Preferably, the underlayment comprises a second layer, which is a top layer providing said moisture barrier. Thus, if there is some moisture in the subfloor, the novel floor underlayment can block moisture. Further, the novel floor underlayment may block emissions caused by the subfloor, such as a plaster or concrete therein.

The underlayment can comprise a first layer, i.e., a bottom layer, which can be perforated. Thus, the moisture can be removed (in form of water vapour) from the subfloor to the underlayment. Further, the underlayment can comprise one layer of foam beads having gaps between adjacent beads, thereby forming pathways for the moisture. Thus, the spaced beads can act as a vapour control layer. Thus, thanks to the bottom layer having perforated structure, the inner layer having pathways for the moisture, and the top layer having the moisture barrier, the floor underlayment can help to remove the moisture from the subfloor to the environment. Thus, the moisture may not cause problems to the subfloor nor the finished floor.

The novel floor underlayment can have a thickness in a range between 0.8 mm and 1.5 mm, preferably from 0.9 mm to 1.3 mm, and most preferably from 1.0 mm to 1.2 mm. Thus, the floor underlayment can be suitable for thin floors.

The floor underlayment can comprise
 a first layer, which is preferably a plastic film layer,
 a second layer, which is preferably a plastic film layer, and
 an inner layer between the first layer and the second layer, wherein
 the inner layer has one layer of foam beads.

The first layer has a first surface and a second surface. The second layer has a first surface and a second surface. Advantageously, the inner layer has only one layer of foam beads.

The floor underlayment may further comprise at least one adhesive layer between the first layer and the second layer. Preferably, the floor underlayment has an adhesive layer on inner surfaces of the first layer and the second layer.

A method for manufacturing the novel floor underlayment can comprise the following steps:
 providing a first layer, which is preferably a plastic film layer, such as a perforated plastic film layer,
 providing a second layer, which is preferably a plastic film layer, such as an unperforated plastic film layer,
 applying an adhesive layer onto a first surface of the first layer,
 applying an adhesive layer onto a first surface of the second layer,
 applying one layer of foam beads having a diameter of less than 1.5 mm between the first surface of the first layer and the first surface of the second layer so that the applied beads are in contact with the adhesive layers and said beads maintain their thickness,
thereby obtaining the floor underlayment having an inner layer between the first layer and the second layer.

The method may comprise the following step:
 laminating the foam beads between the first layer and the second layer in a laminating step so that the foam beads are in contact with the adhesive layers, wherein said beads preferably maintain their thickness during the laminating step.

Advantageously, the foam beads comprise, primarily contain, or consist of expanded polystyrene (EPS). Preferably, the amount of polystyrene is at least 90 wt.-%, more preferably at least 95 wt.-%, or at least 99 wt.-%, calculated from the total weight of the foam beads.

Thus, the foam beads are preferably expanded polystyrene (EPS) beads. Most advantageously, the foam beads consist of expanded polystyrene.

The foam beads can have a diameter of equal to or less than 1.3. mm, preferably equal to or less than 1.1 mm. Advantageously, at least 90 wt. % of the beads have a diameter between 0.95 mm and 1.3 mm. More preferably at least 95 wt. % of the beads have a diameter between 0.95 mm and 1.3 mm and/or at least 90 wt. % of the beads have a diameter between 0.95 mm and 1.1 mm. Most preferably, at least 95 wt. % of the beads have a diameter between 0.95 mm and 1.1 mm. Thus, thanks to the foam beads having similar diameters, the foam beads may not be harmed during a manufacturing process of the floor underlayment. Further, a weight on the flooring may not harm the underlayment. Thus, compressive strength of the floor underlayment can be significantly increased.

Further, the foam beads can have a density of equal to or more than 28 kg/m$^3$, preferably equal to or more than 30 kg/m$^3$. Still further, the foam beads can have a density of equal to or less than 41 kg/m$^3$, preferably equal to or less than 39 kg/m$^3$. The density of the foam beads has a significant effect on compressive strength of the floor underlayment. Thanks to the one layer of foam beads, preferably EPS beads, having said diameter and said density, compressive strength of the floor underlayment can be significantly increased.

A compressive strength of the floor underlayment can be at least 150 kPa, such as equal to or more than 180 kPa, and typically equal to or more than 200 kPa. Thus, the floor underlayment can have good strength properties. Said diameter of the foam beads, said density of the foam beads, and substantially intact structure of said foam beads can significantly improve the compressive strength.

As discussed above, the inner layer can have one layer of foam beads. Preferably, the inner layer has only one layer of foam beads. Thus, in an embodiment, the inner layer consists of one layer of foam beads.

Preferably, the number of the foam beads is at least 300 000 pieces/m$^2$, more preferably equal to or more than 350 000 pieces/m$^2$, and most preferably equal to or more than 380 000 pieces/m$^2$. Further, the number of foam beads can be equal to or less than 800 000 pieces/m$^2$, more preferably equal to or less than 700 000 pieces/m$^2$, and most preferably equal to or less than 600 000 pieces/m$^2$. The number of the foam beads may have an effect on pathways for moisture. Further, the number of the foam beads may significantly affect, for example, the compressive strength of the floor underlayment.

The first layer, i.e. the first outer layer, can comprise a plastic film, such as a thermoplastic film. The first layer preferably comprises polyolefin, most preferably polyethylene. Further, the second layer, i.e. the second outer layer, can comprise a plastic film, such as a polyolefin film. Most preferably, the second layer comprises polyethylene.

Said outer layers, if they do not have holes, can provide good moisture barrier for the floor underlayment. Furthermore, said materials may decrease manufacturing costs of the manufactured product. Still further, said materials can be in a form of a thin film suitable for a thin floor underlayment.

The first layer can have a thickness in a range between 0.02 mm and 0.09 mm, preferably between 0.04 mm and 0.07 mm. Further, the second layer can have a thickness in a range between 0.02 mm and 0.09 mm, preferably between 0.02 mm and 0.04 mm. Thus, it is possible to obtain a thin laminated structure having suitable properties for the floor underlayment. The total basis weight of the floor underlayment is preferably from 105 g/m$^2$ to 135 m$^2$.

The floor underlayment can comprise adhesive(s). The total amount of the adhesive(s) in the floor underlayment can be from 20 g/m$^2$ to 35 g/m$^2$. Thus, it is possible to fasten the foam beads firmly to the outer layers. The inner layer is preferably laminated between the first layer and the second layer by using adhesive(s).

The novel floor underlayment can have an improved compressive strength; hence, it can hold in its shape under a quite heavy load. Despite of the thin structure, the novel floor underlayment can eliminate slight variations of the subfloor and, hence, it can provide even and firm support to the flooring.

A flooring system can comprise the novel floor underlayment and the floor. The finished flooring may comprise wood planks, laminate, LVT or parquet flooring. The floor is preferably an LVT floor.

The floor underlayment may be arranged between a subfloor and a finished floor. The floor underlayment may be suitable for thin floors, e.g. LVT floors. The floor underlayment may be suitable for intermediate floors. The floor underlayment may be suitable for floating floors.

Thanks to the structure and materials of the novel floor underlayment, the novel floor underlayment can have an emission classification of building materials corresponding to M1 Emission Classification of Building Materials in Finland, which is the best emission classification of building materials. Therefore, the floor underlayment can have low emissions.

The novel floor underlayment does not typically comprise paper or cardboard, hence, it is typically manufactured without paper and cardboard. Still further, thanks to the materials and the structure of the floor underlayment, the product may not have any mold relating problems.

BRIEF DESCRIPTION OF THE DRAWINGS

In the following, the invention will be illustrated by drawings in which.

The figures are illustrations which may not be in scale. Similar parts are indicated in the figures by the same reference numbers.

DETAILED DESCRIPTION

All embodiments in this application are presented as illustrative examples, and they should not be considered limiting.

The following reference numerals are used in this application:

10 floor, 11 external surface of the floor, 20 subfloor,
21 external surface of the subfloor,
100 floor underlayment,
110 first layer, i.e., the bottom layer of the underlayment,
111 second surface of the first layer,
112 first surface of the first layer,
120 second layer, i.e., the top layer of the underlayment,
121 second surface of the second layer,
122 first surface of the second layer,
130 inner layer,
131 foam bead(s), and
135 gap, i.e., pathway for moisture.

In this application, thickness, width, squareness, flatness, grammage (area weight), compressive strength, compressive creep, punctual conformability and dynamic load resistance are determined according to the standard EN 16354:2018.

All percentages, parts and ratios are based upon the total dry weight, unless otherwise specified. The term "weight percent" may be denoted as "wt. %".

The term "first layer" refers to the bottom layer of the underlayment 100, i.e., the layer that is, in use, in contact with the subfloor 20. The first layer may also be referred as a first outer layer herein.

The term "second layer" refers to the top layer of the underlayment 100, i.e., the layer that is, in use, in contact with the floor 10. The second layer 120 may act as a vapour control layer limiting the passage of water vapour (moisture) in the floor covering. The second layer may also be referred as a second outer layer herein.

In this application, the first layer and the second layer are also referred as "outer layers".

In this application, the term "inner layer 130" refers to a layer between the first layer 110 and the second layer 120. Particularly, the term "inner layer" refers to foam beads which are arranged between the first layer 110 and the second layer 120. The inner layer 130 has one layer of foam beads. Preferably, the inner layer has only one layer of foam beads. Typically, at least some of the foam beads 131 are in contact with the adjacent foam beads 131 while some other foam beads 131 may not be in contact with adjacent foam beads, thereby providing pathways 135 for moisture.

In this application, the term "laminate" means a product made from layers, which layers have been attached or bonded to one another.

The term "EPS beads" refers to expanded polystyrene beads. EPS beads are closed cell material which do not typically absorb water and, hence, the EPS beads 131 can help to remove moisture from the subfloor 20 via the inner layer 130. Furthermore, EPS beads are relatively inexpensive material, hence, they may decrease the manufacturing costs of the product. Further, EPS beads can be used for improving damping properties of the novel floor underlayment 100.

In use, the floor underlayment 100 is located between the subfloor 20 and a floor 10.

Figure 1:
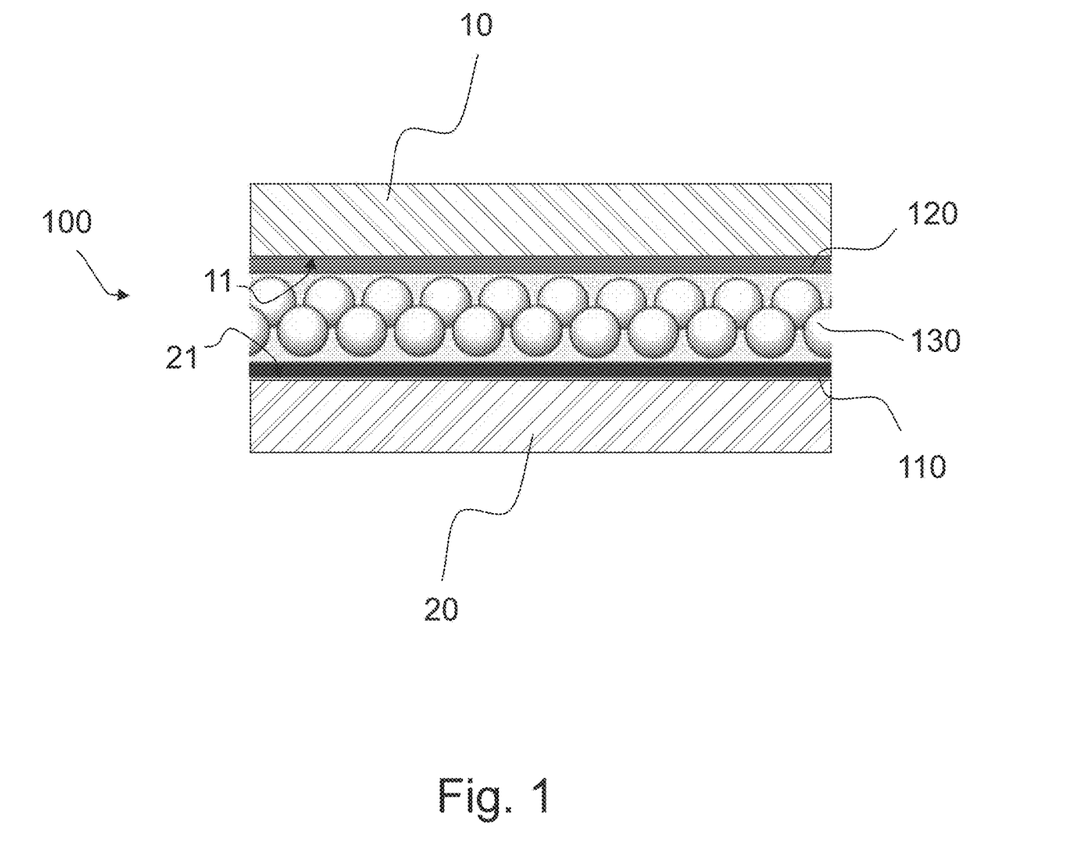
FIG. 1 illustrates a flooring system comprising a floor and a floor underlayment.

An example of a flooring system comprising the floor underlayment 100 and the floor 10 is illustrated in FIG. 1.

In this application, the term "external surface" refers to a surface that is either a finished floor 10 or a subfloor 20. Thus, the external surface 11 of the floor 10 is directed to the underside surface of the finished floor 10. Further, the external surface 21 of a subfloor 20 is directed to the top surface of the subfloor 20.

In use, the floor underlayment 100 is preferably positioned directly in contact with the underside surface of a finished floor 10 so that the top layer, i.e. the second layer 120, is directly in contact with the underside surface of the floor 10. In other words, the floor underlayment 100 is preferably directly in contact with the external surface 11 of the finished floor 10.

Further, in use, the floor underlayment 100 is preferably positioned directly in contact with the subfloor 20 so that the bottom layer, i.e. the first layer 110, is directly in contact with the top surface of the subfloor 20. In other words, the floor underlayment 100 is preferably directly in contact with the external surface 21 of the subfloor 20.

In this application, the term "finished floor" or "finished flooring" refers to any type of wood floor, laminate floor, linoleum floor, vinyl floor, ceramic floor, marble floor, carpet floor and the like. Advantageously, the finished floor 10 is an LVT floor or a laminate floor. Most advantageously, the finished floor is an LVT floor.

In this application, the term "LVT" refers to Luxury Vinyl Tiles. Despite of the term, LVT is typically available in planks and tiles. LVT floors are known by a person skilled in the art.

LVT floors has vastly become one of the most popular commercial options in today's flooring market. LVT floor is designed to replicate hard surface flooring materials such as wood. LVT floor typically uses a realistic photographic print film. Thus, it is hard to distinguish LVT floor from the products that it mimics. LVT floors may have a surface that is easy to keep clean because dirt may not stick easily. However, with LVT floors, there has been many problems with conventional floor underlying.

The raw materials used in the production of LVT typically include polyvinyl chloride resins (PVC) and calcium carbonate. The novel floor underlayment can be compatible with said materials so that no chemical reaction takes place between the materials of the floor underlayment and the materials of the LVT floor. Therefore, emissions from said chemical reactions can be prevented.

Thanks to the novel solution, it may be possible to use LVT floors with minimal surface preparation. Further, LVT floors may be easily installed on the novel floor underlayment 100. The LVT floor is preferably so called loose-lay floor. The novel floor underlayment 100 may provide many practical benefits for LVT floors. Thanks to the novel solution, vinyl-based floors can be quiet and have good strength properties. Further, vinyl-based floors can be fast to install. Thus, the flooring installation costs, as well as installation times, may be reduced.

The novel underlayment 100 may be used, not only for LVT floors, but also for other kinds of floors.

The floor underlayment 100 may be installed so that it is sandwiched between a subfloor 20 and the underside of a finished floor. The floor underlayment 100 and the floor 10 may conjointly exhibit a noise reduction.

As discussed above, the first layer 110 of the floor underlayment 100 can be, in use, disposed adjacent to the subfloor 20 and the second layer 120 can be disposed, in use, adjacent to the floor.

The first layer 110 and the second layer 120 can be in a form of plastic film sheets. Thus, the first layer 110 can be a plastic film layer. Further, the second layer 120 can be a plastic film layer.

The foam beads 131 can be attached onto the inner surface(s) 112, 122 of the first and/or second layer by using an adhesive. Thus, the underlayment 100 can be a laminate, in which the foam beads and the film layers are attached to one another.

Figure 2A:
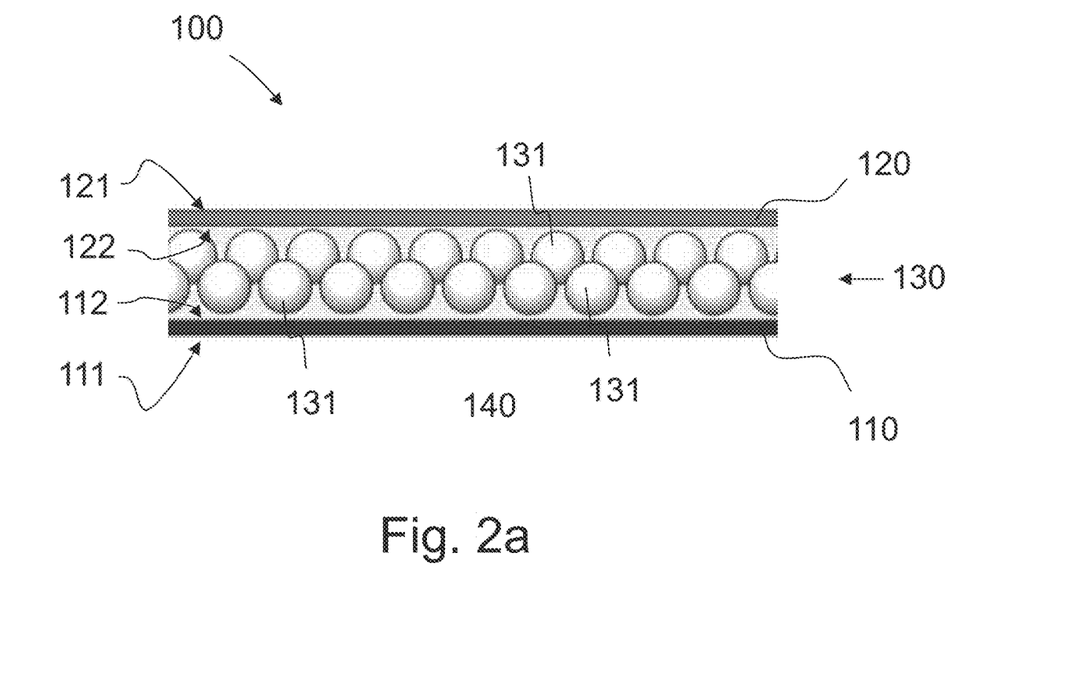
FIG. 2a shows a cross section of a floor underlayment.
Figure 2B:
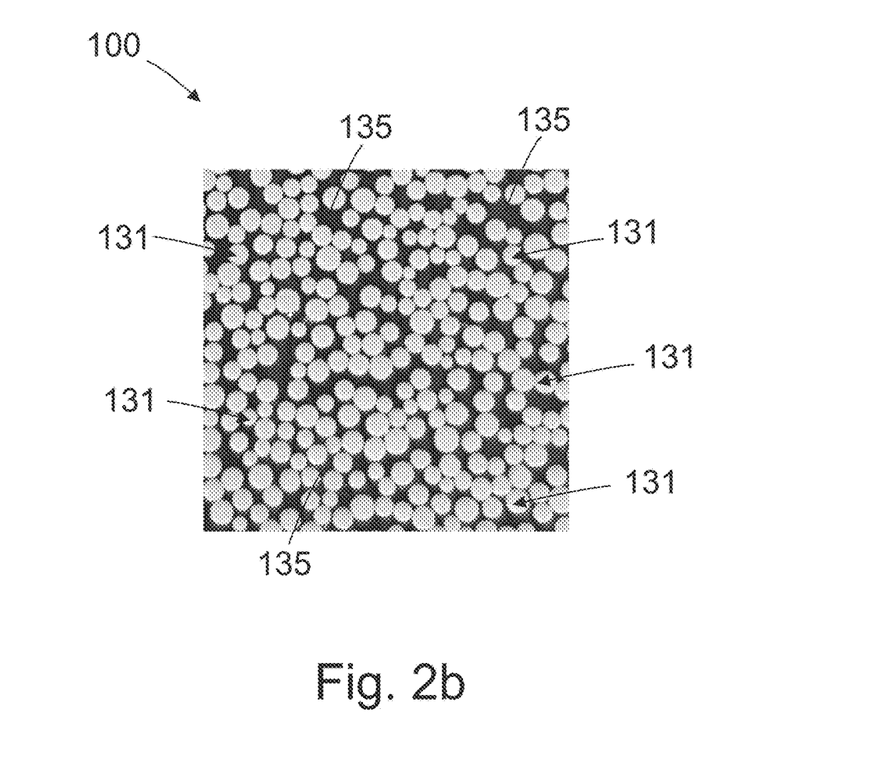
FIG. 2b illustrates a top side of a floor underlayment.

An example of the floor underlayment 100 is illustrated in FIGS. 2a and 2b. The floor underlayment 100 comprises a first layer 110 and a second layer 120. Further, the floor underlayment can comprise an inner layer 130 laminated between said first layer and second layer. Said layers can be laminated by using an adhesive. Preferably, the adhesive is applied to the inner surfaces 112, 122 of the outer layers 110, 120 before the inner layer 130 is laminated between said outer layers. Thus, it is possible to obtain the floor underlayment 100 having improved compressive strength as well as suitable sound reducing properties, The term "thickness" refers to the depth direction of said floor underlayment 100.

The thickness of the floor underlayment 100 can be between 0.8 mm and 1.5 mm, such as 1.1 mm. Therefore, the floor underlayment 100 can be suitable for thin floors, such as LVT floors. The thickness of the floor underlayment 100 is preferably equal to or more than 0.9 mm, more preferably equal to or more than 1.0 mm. Thus, the floor underlayment 100 can be used for levelling the subfloor 20. Further, said thickness may ensure suitable acoustic performance. The thickness of the floor underlayment 100 is preferably equal to or less than 1.4 mm, more preferably equal to or less than 1.3 mm, such as from 0.9 mm to 1.3 mm, and most preferably from 1.0 mm to 1.2 mm. Thus, the floor underlayment can be particularly suitable for thin floors.

In this application, the term "basis weight" refers to the weight per area of the underlayment. Herein, "gsm" refers to g/m$^2$.

The total basis weight of the floor underlayment 100 can be from 100 gsm to 140 gsm (g/m$^2$). Preferably, the total basis weight of the floor underlayment 100 is equal to or more than 105 gsm, more preferably equal to or more than 110 gsm, and most preferably equal to or more than 115 gsm. Thus, it is possible to provide a structure having improved compressive strength. Preferably, the total basis weight of the floor underlayment 100 is equal to or less than 135 gsm, more preferably equal to or less than 130 gsm, and most preferably equal to or less than 125 gsm. Thus, it is possible to provide a thin structure having improved compressive strength and good moisture barrier, wherein the floor underlayment 100 has pathways 135 for moisture removal.

A width of the floor underlayment 100 may be e.g. from 800 mm to 1500 mm, preferably approximately 1100 mm. Said width range may improve easiness of the installation process.

Squareness ($q_{max}$) of the floor underlayment 100 can be less than 5 mm/m, such as from 1 mm/m to less than 5 mm/m, preferably from 1 mm/m to 3 mm/m, Thus, easiness of the installation process can be improved.

Flatness ($S_{max}$) of the floor underlayment 100 is preferably less than 2 mm/m, such as between 0.1 mm/m and 1 mm/m, and preferably between 0.1 mm/m and 0.5 mm/m. Thus, the novel floor underlayment can have a good evenness level, hence, the floor underlayment can perform well with LVT floors.

Compressive strength (determined according to standard EN 16354:2018) can be at least 150 kPa. Compressive strength of the floor underlayment 100 is preferably more than 170 kPa, more preferably equal to or more than 185 kPa, such as at least 190 kPa and most preferably at least 195 kPa, such as equal to or more than 200 kPa. Thus, the integrity of the flooring system can be improved. The good compressive strength of the novel floor underlayment can improve durability of floors, particularly the durability of tongue and groove joints of thin floors. The compressive strength of the floor underlayment 100 may be less than 300 kPa, or less than 250 kPa.

Compressive creep of the floor underlayment 100 may be at least 5 kPa, such as from 5 kPa to 10 kPa. Thus, the floor underlayment can have a good resistance against a static load applied by, e.g. furniture feet.

Punctual conformability of the floor underlayment 100 can be from 0.9 mm to 1.3 mm, preferably in a range between 1.0 mm and 1.2 mm. Punctual conformability is the ability of the underlay to smoothen small local defects of the subfloor 20 (e.g. small protruding particles) and/or small particles laying on the subfloor 20 when installed under a laminate floor covering. Thus, floors, such as thin LVT floors, can have a good durability, Dynamic load resistance of the floor underlayment 100 can be equal to or more than 100 000. Typically, the dynamic load resistance of the underlayment is between 100 000 and 200 000. In an embodiment, the dynamic load resistance can be more than 200 000. Said dynamic load resistance can improve resistance of the floor underlayment 100 against long-term dynamic loads applied by, e.g, people walking or sitting on a chair. The foam beads having suitable density and thickness values can improve said dynamic load resistance.

The flooring system preferably provides some space between the flooring and a wall. Thus, the moisture may be removed through the first layer 110, via pathways 135 of the inner layer 130 and into this space between the floor and the wall. Thus, from said space, the moisture may escape the flooring system into the surrounding atmosphere.

Impact sound reduction of the novel floor underlayment for LVT floors is typically at least 19 dB, such as from 20 dB to 23 dB.

The first layer has preferably a single layer construction. Thickness of the first layer 110, i.e., the bottom layer adjacent to the subfloor 20 (in use), is preferably 0.03 mm to 0.07 mm. The thickness of the first layer 110 is selected to have suitable strength and resistance properties for the floor underlayment 100. Further, the thickness is selected to provide thin floor underlayment 100. Thickness of the first layer 110 is preferably equal to or more than 0.035 mm, more preferably equal to or more than 0.040 mm and most preferably equal to or more than 0.045 mm. Thus, the strength of the floor underlayment 100 may be increased. Thickness of the first layer 110 is preferably equal to or less than 0.065 mm, more preferably equal to or less than 0.060 mm and most preferably equal to or less than 0.055 mm. Thus, the thickness of the floor underlayment 100 may be particularly suitable for VLT floors.

The first layer may include one or more polymers having desired properties. The first layer may include thermoplastic polymers including polyolefins, polystyrenes, polyurethanes, polyvinyl chlorides, polyesters, and ionomers provided that the desired properties of the film layer may be maintained.

The first layer can comprise polyolefin polymer(s). The amount of polyolefin(s) in the first layer is preferably at least 50 wt. %, more preferably at least 70 wt. %, and most preferably equal to or more than 80 wt. %, calculated from the total weight of the first layer. Furthermore, the first layer may comprise equal to or less than 100 wt. %, more preferably equal to or less than 99.9 wt.-%, said materials, calculated from the total weight of the first layer. Polyolefin can be used to obtain suitable properties for the floor underlayment.

Advantageously, the first layer comprises, primarily contains, or consists of polyethylene. Preferably, the first layer comprises at least 50 wt.-%, more advantageously at least 80 wt.-%, and preferably at least 90 wt.-% polyethylene, calculated from the total weight of the first layer. Furthermore, the first layer may comprise equal to or less than 100 wt. %, more preferably equal to or less than 99 wt.-%, polyethylene, calculated from the total weight of the first layer.

Polyethylene can be particularly suitable polymer for the underlayment. It can improve easiness of the manufacturing process as well as easiness of the installing process. Further, polyethylene may have suitable strength and barriers properties, hence, it may improve the strength and/or barrier properties of the underlayment. Polyethylene, particularly perforated polyethylene film, may be advantageous for the bottom layer of the floor underlayment.

Suitable polyolefins may include polyethylene homopolymers and copolymers. Thus, the polyethylene polymer may be either heterogeneous or homogeneous. Preferably the polyolefin is homogeneous. Polyethylene homopolymer can comprise low-density polyethylene (LD-PE), and/or linear low-density polyethylene (LLD-PE), and/or high-density polyethylene (HD-PE). These terms are known by a skilled person.

Advantageously, the first layer comprises, primarily contains, or consists of LD-PE polyethylene film. Preferably, the first layer comprises at least 50 wt.-%, more advantageously at least 80 wt.-%, and preferably at least 90 wt.-% polyethylene, calculated from the total weight of the first layer. Furthermore, the first layer may comprise equal to or less than 100 wt. %, more preferably equal to or less than 99.9 wt.-%, LD-polyethylene, calculated from the total weight of the first layer.

The first layer 110, i.e. the bottom layer, may have a perforated structure. In other words, the first layer can have several holes, preferably several small holes. Therefore, moisture can be removed from the subfloor 20 via the holes of the first layer. Thus, the moisture is not trapped between the subfloor 20 and the floor underlayment 100. The holes of the first layer can be spaced so that two adjacent holes has a distance e.g. from 8 mm to 50 mm. The diameter of the holes may vary. The holes may have a diameter e.g, approximately 1 mm. In an example, the number of holes in the first layer may be in a range between 1000 holes/m$^2$ and 10000 holes/m$^2$, preferably from 3000 holes/m$^2$ to 7000 holes/m$^2$.

The second layer can be a plastic film layer. Preferably, the second layer has a single layer construction. Thickness of the second layer 120, i.e., the layer adjacent to the floor 10, can be from 0.015 mm to 0.07 mm. Thickness is selected to provide suitable properties, such as suitable moisture barrier. Further, the thickness can be selected to provide a floor underlayment 100 which is suitable for thin floors.

Thickness of the second layer 120, i.e., the top layer, is preferably between 0.020 mm and 0.06 mm. Thickness of the second layer 120 is preferably equal to or more than 0.020 mm, more preferably equal to or more than 0.025 mm and most preferably equal to or more than 0.030 mm. Thus, the strength of the floor underlayment 100 may be increased. Further, suitable water barrier may be provided. Thickness of the second layer 120 is preferably equal to or less than 0.050 mm, more preferably equal to or less than 0.045 mm and most preferably equal to or less than 0.040 mm. Thus, the thickness of the floor underlayment 100 may be particularly suitable for LVT floors, The second layer may include plastic polymers and/or e.g. aluminum. The aluminum may provide suitable barrier properties for the underlayment. The second layer may include one or more thermoplastic polymers including polyolefins, polystyrenes, polyurethanes, polyvinyl chlorides, polyesters, and ionomers provided that the desired properties of the film layer may be maintained.

The second layer can comprise polyolefin polymer(s). The amount of polyolefin(s) is preferably at least 50 wt. %, more preferably at least 80 wt. %, and most preferably equal to or more than 90 wt. %, calculated from the total weight of the second layer. Thus, the floor underlayment 100 can block the moisture and helps it to evaporate. Polyolefins can be used to obtain suitable properties for the floor underlayment 100. Furthermore, the second layer may comprise polyolefin equal to or less than 100 wt. %, more preferably equal to or less than 99 wt.-%, calculated from the total weight of the second layer.

Advantageously, the second layer comprises, primarily contains, or consists of polyethylene. Preferably, the second layer comprises at least 50 wt.-%, more advantageously at least 80 wt.-%, and preferably at least 90 wt.-% polyethylene, calculated from the total weight of the first layer. Furthermore, the second layer may comprise equal to or less than 100 wt. %, more preferably equal to or less than 99 wt.-%, polyethylene, calculated from the total weight of the second layer.

Polyethylene can be particularly suitable polymer for the underlayment. It can improve easiness of the manufacturing process as well as easiness of the installing process. Further, polyethylene may have suitable strength and barriers properties, hence, it may provide suitable strength and/or barrier properties for the underlayment. Polyethylene may be particularly suitable for the top layer of the floor underlayment. Further, the outer layers 110, 120, if comprising polyolefins, may be particularly suitable for use in combination with the EPS foam beads.

Suitable polyolefins may include polyethylene homopolymers and copolymers. Thus, the polyethylene polymer may be either heterogeneous or homogeneous. Preferably the polyolefin is homogeneous. Polyethylene homopolymer can comprise low-density polyethylene (LD-PE), linear low-density polyethylene (LLD-PE), and/or high-density polyethylene (HD-PE).

Most advantageously, the second layer comprises, primarily contains, or consists of HD-PE. Preferably, the second layer comprises at least 50 wt.-%, more advantageously at least 80 wt.-%, and most preferably at least 90 wt.-% HD-polyethylene, calculated from the total weight of the second layer. Thus, it is possible to obtain improved moisture barrier on the top of the floor underlayment 100. Furthermore, the second layer may comprise equal to or less than 100 wt. %, more preferably equal to or less than 99 wt.-% HD-polyethylene, calculated from the total weight of the second layer.

The first layer 110 and/or the second layer 120 may further comprise fillers and/or additives. For example, polyethylene has been found to work well as outer layers when blended with appropriate amounts of additives and/or fillers.

The second layer 120, i.e., the top layer, may block the moisture. Thus, thanks to the second layer, moisture coming from the subfloor 20 may not influence the floor. For example, occasional condensation can be expected because of differences in temperature, wet conditions in underneath rooms or in case of an underfloor heating, hence, the top layer may protect the floor covering system from swelling or bending or other negative effects. Furthermore, the inner layer 130 having spaced structure may help the moisture to evaporate.

At least some of the foam beads 131 of the inner layer can be spaced from adjacent foam beads 131, thereby forming pathways 135 for moisture. Thus, it can be possible to remove moisture from the subfloor and convey it via the pathways 135 of the inner layer to a space between the floor and a wall, therefore, the moisture may be evaporated to the environment. Thus, the inner layer is preferably formed so that there are pathways for moisture. Further, the pathways are preferably air-filled gaps, i.e., the pathways may not comprise solid material(s). Thus, the moisture can be efficiently conveyed via the pathways to a space between the floor and a wall.

The outer layers are preferably substantially even layers in order to improve properties of the floor underlayment.

The film layers and the foam beads 131 may be attached together in a variety of known ways. These are known by a skilled person. Suitable methods of attaching the film and foam beads 131 together include, but are not limited to, the application of an adhesive.

Preferably, the foam beads 131 are arranged between the outer layers by using an adhesive, thereby forming an inner layer between said outer layers. Preferably, the adhesive is applied to the inner surfaces 112, 122 of the outer layers 110, 120 before the inner layer 130 is laminated between said outer layers.

The total amount of adhesive in the floor underlayment is preferably equal to or more than 20 $g/m^2$, more preferably equal to or more than 22 $g/m^2$, and most preferably equal to or more than 24 $g/m^2$, such as at least 26 $g/m^2$. Thus, the foam beads 131 may be attached firmly to the outer layers. Further, the total amount of adhesive in the floor underlayment is preferably equal to or less than 35 $g/m^2$, more preferably equal to or less than 31 $g/m^2$, and most preferably equal to or less than 29 $g/m^2$. Thus, it is possible to decrease the manufacturing costs of the product.

The adhesive may be pressure sensitive adhesive. The adhesive may be a pressure sensitive adhesive layer that is applied to the first layer 110 and/or to the second layer 120. To improve the properties of the floor underlayment 100, the adhesive layer is preferably applied to the inner surfaces 112, 122 of the first layer 110 and the second layer 120, Although the pressure sensitive adhesive may be the most advantageous adhesive for the underlayment, also other types of adhesives may be used. The other types of adhesives that may be employed include but are not limited to organic solvent-based, water-based, hot melt adhesives and acrylic adhesives. However, the adhesive(s) used for the floor underlayment 100 is/are preferably environmentally friendly. Further, the adhesive may be substantially transparent.

The inner layer 130 can comprise one layer of solid foam beads. The foam beads 131 are preferably EPS beads. The foam beads are preferably in a form of spherical beads. This kind of structure can function to dampen the noise from walking.

The beads may be pre-treated to remove static from the foam beads 131. This may improve easiness of the manufacturing process. A skilled person knows how to remove static from the beads.

At least part of the foam beads 131 can be spaced from the adjacent beads. Thus, the inner layer 130 can include a plurality of spaced foam beads 131. Thus, the compressive strength of the floor underlayment 100 may be improved. Further, the gaps between the beads 131 can form pathways 135, which can improve the moisture removal.

The first layer and the inner layer 130 may permit moisture to move into the pathways 135. Thereafter, the moisture can follow through the pathways 135 so that it can efficiently escape the flooring system.

The beads 131 used for the novel floor underlayment 100 can have a high density of equal to or more than 28 $kg/m^3$, such as in a range between 28 $kg/m^3$ and 42 $kg/m^3$. The beads 131 having said high density can improve the compressive strength of the floor underlayment 100 while providing suitable sound reduction for floorings. The density of the beads 131 is preferably at least 30 $kg/m^3$, more preferably at least 32 $kg/m^3$, and most preferably at least 34 $kg/m^3$. Thus, it is possible to significantly improve the compressive strength of the floor underlayment 100. Further, the density of the beads 131 is preferably equal to or less than 41 $kg/m^3$, more preferably equal to or less than 39 $kg/m^3$, and most preferably equal to or less than 38 $kg/m^3$. Thus, it is possible to obtain suitable sound reduction as well as suitable compressive strength for the floor underlayment 100, particularly in a case of the EPS beads.

The number of beads 131 in the inner layer 130 is preferably equal to or more than 300 000/$m^2$, more preferably equal to or more than 350 000/$m^2$, and most preferably equal to or more than 380 000/$m^2$. The technical effect is to provide improved compressive strength. Further, the number of the beads 131 in the inner layer 130 is preferably equal to or less than 800 000/$m^2$, more preferably equal to or less than 700 000/$m^2$, and most preferably equal to or less than 600 000/$m^2$. Therefore, the moisture may be easily removed from the subfloor 20 via the pathways of the inner layer 130. Thus, the moisture is not trapped within the flooring system.

A diameter of the beads 131 can be equal to or less than 1.4 mm, advantageously equal to or less than 1.3 mm, more preferably equal to or less than 1.2 mm, and most preferably equal to or less than 1.1 mm. Thus, it is possible to obtain thin floor underlayment. Variation in said diameter may have significant effect on the compressive strength. Thus, preferably at least 90 wt. %, or at least 95 wt. %, of the beads 131 have a diameter in a range between 0.95 mm and 1.30 mm, more preferably at least 90 wt. %, or at least 95 wt. %, of the beads have a diameter in a range between 0.95 mm and 1.20 mm, and most preferably at least 95 wt. % of the beads have a diameter in a range between 0.95 mm and 1.10 mm. Thus, the compressive strength of the floor underlayment 100 may be significantly improved. Further, the beads having similar diameter are not as easily damaged as beads having different diameters. The floor underlayment 100 of the present invention may provide a significant improvement in the compressive strength.

Preferably, the floor underlayment 100 has from 3% to 10% by weight the adhesive, more preferably from 4% to 7% by weight said adhesive. Further, preferably, the floor underlayment 100 has from 23% to 31% by weight the foam beads, more preferably from 25% to 28% by weight said foam beads. Furthermore, preferably, the total amount of material(s) of the outer layers in the floor underlayment 100 is in a range between 58 wt. % and 78 wt. %, more preferably from 62% to 72% by weight. The total sum of the above-mentioned materials can be equal to or less than 100%, calculated from the total weight of the floor underlayment.

Figure 4:
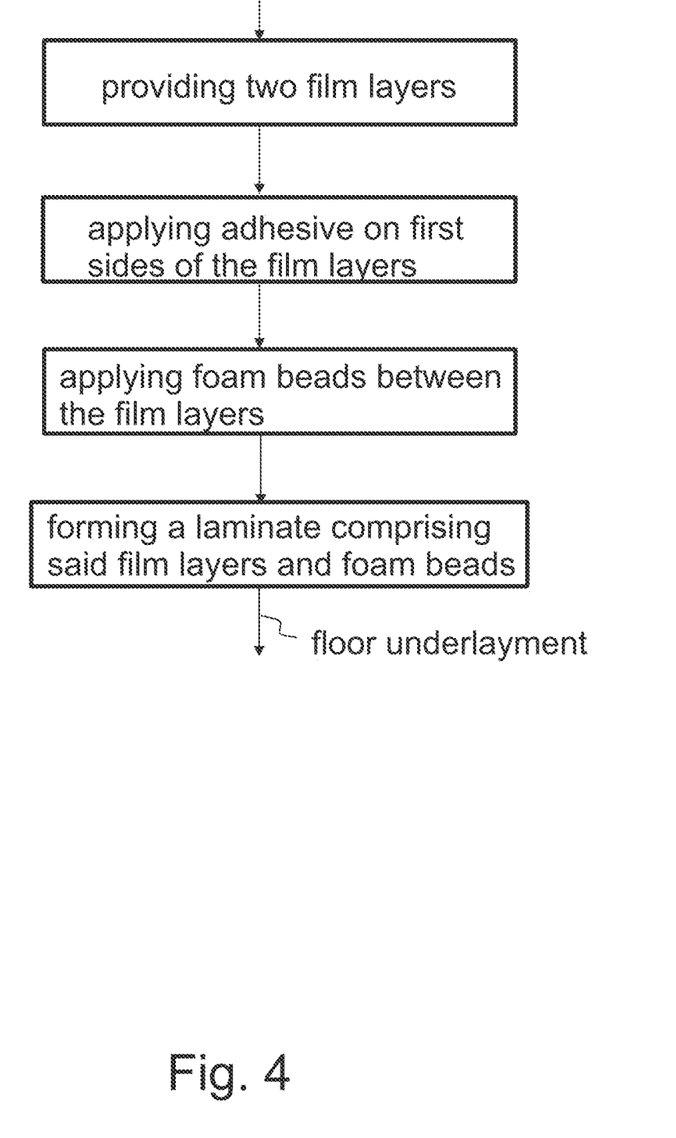
FIG. 4 illustrates an example manufacturing method.

An example method for manufacturing a floor underlayment is shown in FIG. 4. A method for manufacturing a floor underlayment 100 may comprise the following steps:
  providing a first layer,
  providing a second layer,
  applying an adhesive layer onto a first surface of the first layer and/or applying an adhesive layer onto a first surface of the second layer,
  applying one layer of foam beads having a diameter of less than 1.5 mm between the first surface of the first layer and the first surface of the second layer so that the applied beads are in contact with the adhesive layer, thereby obtaining an inner layer, and laminating the foam beads between the first layer (110) and the second layer (120) in a laminating step so that a thickness of the foam beads is maintained in the laminating step, thereby obtaining the floor underlayment 100.

Said first surfaces are the inner surface(s) 112, 122 of the outer layers, when the floor underlayment 100 is obtained. The first layer is advantageously perforated layer having holes.

The method may further comprise the following step(s):
perforating the first layer, and/or
perforating the second layer.

The perforated structure of the first layer may help moisture to evaporate. Advantageously, the second layer 120, i.e., the top layer, is not perforated. Thus, the floor underlayment 100 may block the moisture coming from the subfloor 20. Thus, the moisture can be conveyed via the inner layer 130 and evaporated near a wall.

The method may further comprise the following step:
screening the beads so that at least 90 wt. %, more preferably at least 95 wt. % and most preferably at least 98 wt. % of the beads have a diameter equal to or less than 1.5 mm, more preferably equal to or less than 1.3 mm, and most preferably equal to or less than 1.1 mm.

Thus, thanks to the beads having similar diameters, the compressive strength of the floor underlayment 100 may be significantly improved. Further, the beads having similar diameters are not as easily damaged as beads having different diameters. Thus, the floor underlayment 100 of the present invention may provide a significant improvement in compressive strength.

In an advantageously embodiment, the method comprises:
screening the beads so that at least 90 wt. % of the foam beads have a diameter between 0.95 mm and 1.4 mm, more preferably at least 90 wt. % of the foam beads have a diameter between 0.95 mm and 1.1 mm, and most preferably at least 95 wt. % of the foam beads have a diameter between 0.95 mm and 1.1 mm.

Thus, the compressive strength of the floor underlayment 100 may be improved, and the beads may not be as easily damaged as beads having different diameters.

The screen can be selected so that the foam beads having a greater diameter than a predetermined value are conveyed away from the system as a reject.

Applying the foam beads may comprise the following step:
blowing the beads onto an outer layer.

Conventionally, during a manufacturing process of the floor underlayment 100, beads, if used, are highly compressed. Thus, the beads have typically been at least partly broken, which can significantly decrease many properties of the underlayment.

The novel inner layer 130 can comprise beads which structure is not too much broken. Thanks to the novel floor underlayment, the compressive strength of the floor underlayment 100 may be substantially improved.

Advantageously, diameters of the foam beads are maintained during the manufacturing process of the floor underlayment. Thus, strength properties, such as a compressive strength of the floor underlayment 100, may be significantly improved. In an embodiment, the diameters of the foam beads are decreased, at most, 5% during the manufacturing process of the floor underlayment, preferably the diameters of the foam beads are decreased less than 3%, more preferably less than 2%, and most preferably less than 1% during the manufacturing process of the floor underlayment. Thus, the compressive strength of the floor underlayment 100 may be significantly improved.

The flooring system may be assembled in any known manner. In one embodiment, the underlayment 100 material is positioned on a subfloor 20 in a free lying manner. The floor underlayment 100 may not be adhered to the subfloor 20. The floor may be positioned on the underlayment 100 material so that planks or tiles are fit together by using a tongue-in-groove arrangement.

A width of the top layer may be e.g. approximately 20 cm greater than a width of the inner layer and the bottom layer. This may help to install the floor underlayment 100, because said feature may prevent a need to tape the adjacent floor underlayment materials one to another.

Thanks to the novel floor underlayment, the floor underlayment 100 and finished LVT floor conjointly may exhibit a noise reduction of from about 20 dB to about 23 dB, measured according to standard EN ISO 10140-3 and EN ISO 717-2.

In some embodiments, the first layer 110 and/or the second layer 120 and/or the inner layer 130 may include one or more additives, such as antioxidants, fire retardants, anti-bacterial agents, anti-microbial agents, anti-fungal agents, anti-static agents, and/or other additives.

EXAMPLE

Samples of the novel floor underlayment were manufactured as follows:
providing a perforated PE film,
providing an unperforated PE film,
applying adhesive layers onto the inner surfaces of both layers,
providing EPS beads, and
applying the beads between the first layer and the second layer so that one layer of EPS beads was formed between said layers.

Figure 3A:
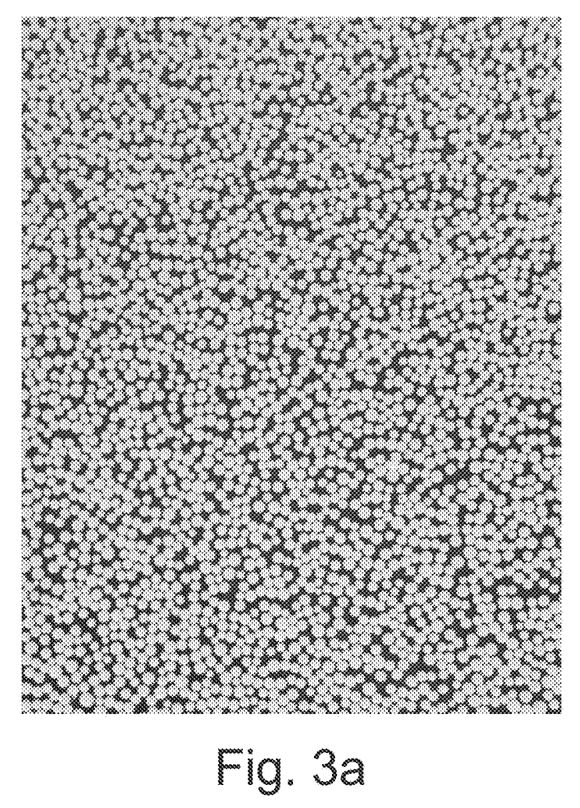
FIGS. 3a-b show photos from experimental tests.
Figure 3B:
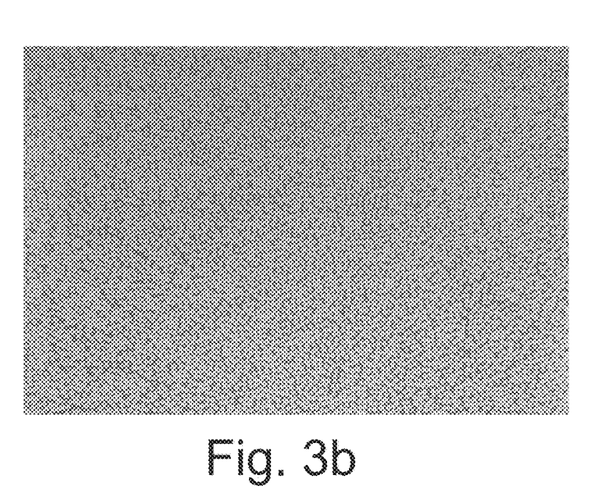

Photos from the experimental test are shown in FIGS. 3a-b.

The obtained samples were tested according to the standard EN 16354:2018. The test results from samples having
a thickness of 0.05 mm for the perforated layer,
a thickness of 0.03 mm for the unperforated layer,
the total amount of adhesive of 26 g/m$^2$, and
EPS beads having a diameter from 0.95 mm to 1.1 mm
are shown in Table 1.

TABLE 1 test results

| Characteristics | Performance |
| --- | --- |
| Thickness | 1.1 mm |
| Width | 1100 mm |
| Squareness | 2 mm/m |
| Flatness | 0.2 mm/m |
| Area weight | 120 g/m$^2$ |
| Compressive Strength | 200 kPa |
| Compressive creep | 5 kPa |
| Punctual conformability | 1.1 mm |
| Dynamic load resistance | 100 000 . . . 200 000 |

As can be seen, the properties of the novel floor underlayment having a thickness of 1.1. were very good. For example, the compressive strength of the novel product was excellent.

The invention has been described with the aid of illustrations and examples. The methods or any product obtained by the methods are not limited solely to the above presented embodiments but may be modified within the scope of the appended claims.

The invention claimed is:

1. A floor underlayment comprising:
a first layer,
a second layer, and
an inner layer between the first layer and the second layer, wherein:
the inner layer has one layer of foam beads,
the floor underlayment has a thickness from 0.8 mm to 1.5 mm,
the foam beads have a diameter of less than 1.3 mm, and
at least wt. 90% of the foam beads have a diameter in a range between 0.95 mm and 1.3 mm.

2. The floor underlayment according to claim 1, wherein
at least one of the first layer and the second layer is a plastic film layer, and/or
the floor underlayment further comprises at least one adhesive layer between the first layer and the second layer, and/or
the foam beads are expanded polystyrene (EPS) beads.

3. The floor underlayment according to claim 1, wherein
the foam beads have a density equal to or more than 28 $kg/m^3$,
and equal to or less than 41 $kg/m^3$.

4. The floor underlayment according to claim 1, wherein the foam beads have a diameter equal to or less than 1.1 mm.

5. The floor underlayment according to claim 4, wherein at least 95 wt. % of the foam beads have a diameter in a range between 0.95 mm and 1.1 mm.

6. The floor underlayment according to claim 1, wherein
the first layer comprises polyolefin, and/or
the second layer comprises polyolefin.

7. The floor underlayment according to claim 1, wherein
the inner layer comprises gaps between adjacent foam beads, thereby forming pathways for moisture.

8. The floor underlayment according to claim 1, wherein
the first layer has a thickness in a range between 0.02 mm and 0.09 mm, and/or
the second layer has a thickness in a range between 0.02 mm and 0.09 mm.

9. The floor underlayment according to claim 1, wherein
a total amount of an adhesive in the floor underlayment is in a range between 20 $g/m^2$ and 32 $g/m^2$, and/or
a basis weight of the floor underlayment is in a range between 105 $g/m^2$ and 135 $g/m^2$.

10. The floor underlayment according to claim 1, wherein the floor underlayment comprises:
an adhesive in a range between 3 wt. % and 10 wt. % based on a total weight of the floor underlayment, and/or
the foam beads in a range between 23 wt. % and 31 wt. % based on a total weight of the floor underlayment, and/or
materials of the first and the second layer in a range between 58 wt. % and 78 wt. % based on a total weight of the floor underlayment.

11. A flooring system comprising a floor underlayment according to claim 1, and a floor.

12. A floor underlayment comprising:
a first layer,
a second layer, and
an inner layer between the first layer and the second layer, wherein:
the inner layer has one layer of foam beads,
the floor underlayment has a thickness from 0.8 mm to 1.5 mm, and
a compressive strength of the floor underlayment is equal to or more than 150 kPa.

13. A floor underlayment comprising:
a first layer,
a second layer, and
an inner layer between the first layer and the second layer, wherein:
the inner layer has one layer of foam beads,
the floor underlayment has a thickness from 0.8 mm to 1.5 mm, and
the number of the foam beads is in a range between 300000 pieces/$m^2$ and 800000 pieces/$m^2$.

* * * * *